United States Patent [19]

Hsu et al.

[11] Patent Number: 5,248,756
[45] Date of Patent: Sep. 28, 1993

[54] CRYSTALLIZATION AGENT FOR BISPHENOL-A POLYCARBONATE

[75] Inventors: Chih-Chien Hsu, Houston, Tex.; Gerhard K. Guenther, Blacksburg, Va.; Richele T. Howelton, Austin, Tex.; David E. Bergbreiter, College Station, Tex.; Alan Letton, Bryan, Tex.; Pei-Hua Wang, Sugarland, Tex.

[73] Assignee: Texaco Chemical Company, White Plains, N.Y.

[21] Appl. No.: 824,129

[22] Filed: Jan. 22, 1992

[51] Int. Cl.$^5$ .................. C08G 69/44; C08G 69/40; C08G 63/668; C08L 69/00
[52] U.S. Cl. .................. 528/274; 528/288; 528/292; 528/301; 528/347; 525/408; 525/433; 525/439
[58] Field of Search ............ 528/274, 288, 292, 301, 528/347; 525/408, 433

[56] References Cited

U.S. PATENT DOCUMENTS

| | | | |
|---|---|---|---|
| 4,029,694 | 6/1977 | Weipert | 528/288 |
| 4,503,197 | 3/1985 | Speranza | 528/288 |
| 5,043,191 | 8/1991 | Endres | 427/387 |

FOREIGN PATENT DOCUMENTS

| | | | |
|---|---|---|---|
| 149091 | 7/1985 | European Pat. Off. | 525/433 |
| 313861 | 5/1989 | European Pat. Off. | 528/347 |

OTHER PUBLICATIONS

Letton et al, Characterization and Crystallization Kinetics of PC/Jeffamine PET Blends; ANTEC Conference Jan. 1991.

Hsu et al., Study of the Compatibility of Blends of Polyoxyalkylene amine PET multiblock copolymers and PC; ANTEC Conference Jan. 1991.

Primary Examiner—David J. Buttner
Attorney, Agent, or Firm—James L. Bailey; Kenneth R. Priem; Cynthia L. Kendrick

[57] ABSTRACT

Disclosed is an alternating block copolymer composition useful for enhancing the crystallization of bisphenol-A polycarbonate which comprises the reaction product of a polyoxyalkylene polyamine and poly(ethylene)terephthalate. Also disclosed is a method of synthesizing the alternating block copolymer and a method of using the block copolymer composition in the crystallization of bisphenol-A polycarbonate.

9 Claims, No Drawings

CRYSTALLIZATION AGENT FOR BISPHENOL-A POLYCARBONATE

FIELD OF THE INVENTION

This invention relates to thermoplastics and composites based on polymers and it particularly relates to polymer alloying and blending. More particularly this invention relates to a novel composition based on the synthesis of an alternating block copolymer of polyoxyalkylene polyamine and poly(ethylene)terephthalate which serves to enhance the crystallization kinetics of bisphenol-A polycarbonate.

BACKGROUND OF THE INVENTION

It is known in the art to combine two or more polymers to form one blend having the desirable properties of its constituents. There has been research in the field to find compatible polymers or, in the alternative, compatibilizers for incompatible polymers. In many cases it can be more advantageous to use compatibilizers to promote miscibility between polymers than to produce completely new polymer compositions. The term compatilization refers to the improvement of any desirable property by blending. Examination of a polymer's phase behavior is used to determine the degree of miscibility of the blends.

In particular there has been much interest in the art in providing compatibilizers for blending various polyesters with bisphenol-A polycarbonate. One polyester which, it is believed, would provide a beneficial blend with polycarbonate is poly(ethylene)terephthalate, however, it appears that work in the art would indicate the immiscibility of these two polymers. See Pilati, F., Marianucci, E., and Berti, C. J. Appl. Polym. Sci., 30, 1267 (1985); Hanrahan, B. D., Angeli, S. R., and Runt, J., Polym. Bulletin (Berlin), 15, 455 (1986); Huang, Z. H. and Wang, L. H. Makromol. Chem., Rapid Commun., 7, 255 (1986); and Henrichs, P. M., Tribone, J., Massa, D. J., and Hewitt, J. M., Macromolecules, 21, 1282 (1988).

Other work indicates very limited miscibility of these two polymers. See Nassar, T. R., Paul, D. R., and Barlow, J. W., J. Appl. Polym. Sci., 23, 85 (1979); Murff, S. R., Barlow, J. W., and Paul, D. R., J. Appl. Polym. Sci., 29, 3231 (1984); and Kim, W. and Burns, C., J. Polym. Sci.: Part B, 28, 1409 (1990).

In "Polymer Blends", (Eds. D. R. Pauland S. Newman), Academic Press, New York, 1978, D. R. Paul reviews compatibilizing agents which can enhance the compatibility of polymer-polymer systems. Incompatibility of polymers can be overcome by introduction of a suitable compatibilizing agent, i.e. block or graft copolymers having segments of similar structure or solubility parameter as the polymers being mixed. Where the different segments are not chemically identical, the desired effect may still result if one of the segments of the block or graft is miscible with one of the phases.

It would be very beneficial in the field of polymer blending to identify agents which could overcome the immiscibility of polymer-polymer systems. In particular, it would be a distinct advance in the art if a composition were available which functioned to promote the compatibility of poly(ethylene)terephthalate and Bisphenol-A polycarbonate and to enhance the crystallization of Bisphenol-A polycarbonate.

SUMMARY OF THE INVENTION

It is an object of the present invention to provide a composition which serves to enhance the crystallization of Bisphenol-A polycarbonate, causing an increase in crystallization rates and levels.

This object has been accomplished by the instant invention which is based on the synthesis of an alternating block copolymer of a polyoxyalkyleneamine and poly(ethylene)terephthalate.

DESCRIPTION OF THE PREFERRED EMBODIMENT

According to the present invention a composition useful as an agent for the crystallization of Bisphenol-A polycarbonate is obtained by combining a polyoxyalkylene polyamine, (preferably polyoxypropylene diamine) with poly(ethylene)terephthalate. The composition allows an increased rate of crystallization over anything available in the art. It also enables the control of crystal size through changes in poly(ethylene)terephthalate/polyoxyalkylene polyamine (PET/JEFFAMINE®) block structure. The polyoxypropylene diamines are essentially modified by positioning poly(ethylene)terephthalate blocks on the ends of the polyamines. When added to Bisphenol-A polycarbonate the crystallization kinetics of the polycarbonate are enhanced, increasing crystallization rates and levels to as high as 30–40% in some cases. This also allows for the control of crystal size. Furthermore, the composition crystallizes polycarbonate rapidly, at the lower temperatures associated with the maximum rate of crystallization (170° C. versus 190° C.) and to a higher percentage (up to 40% versus the typical 1% to 10%).

Additional information regarding related aspects of the invention can be found in the following papers, incorporated herein by reference in their entirety: Letton, Alan and Guenther, Gerhard, "Characterization and Crystallization Kinetics of PC/JEFFAMINE®-Pet Blends", prepared for ANTEC Conference (Society of Plastics Engineers) 1991. Letton, Alan; Hsu, C.-C. and Wang; P.-H., "A Study of the Compatibility of Blends of Polyoxyalkyleneamine-Poly(Ethylene Terephthalate) Multiblock Copolymers and Polycarbonate", prepared for ANTEC Conference (Society of Plastics Engineers) 1991.

The polyoxyalkyleneamines useful for forming a copolymer with poly(ethylene)terephthalate can be represented by the formula:

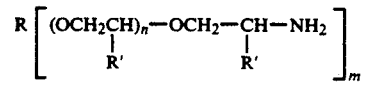

wherein R is the nucleus of an oxyalkylation-susceptible polyhydric alcohol containing 2 to 12 carbon atoms and 2 or 3 hydroxyl groups, R' is hydrogen or methyl, n is a number having an average value of 0 to 100 and m is an integer having a value of 2 to 3.

The polyoxyalkylene polyamines particularly useful in the subject alternating block copolymer are polyoxypropylene diamines represented by the formula:

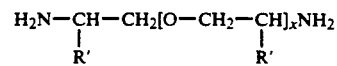

wherein R' independently represents methyl and x is a number having an average value of about 2 to about 70.

Commercially available polyoxypropylene diamines having this formula are JEFFAMINE ® D-series products. JEFFAMINE ® amine products having this structural formula include polyoxypropylene diamines (wherein R' is methyl) having an average molecular weight of about 230 wherein the value of x is between 2 and 3 (JEFFAMINE ® D-230 amine), a polyoxypropylene diamine having an average molecular weight of about 400 wherein x has a value between about 5 and 6 (JEFFAMINE ® D-400 amine), a polyoxypropylene diamine product having an average molecular weight of about 2000 wherein x has a value of about 33 (JEFFAMINE ® D-2000 amine), and a product having an average molecular weight of about 4000 where x has a value of about 60 (JEFFAMINE ® D-4000 amine).

The bisphenol-A polycarbonate (PC) useful in the instant invention must have a molecular weight greater than the critical entanglement molecular weight. The polycarbonate used in the examples was a 27,000 molecular weight commercial grade polycarbonate having a glass transition temperature (Tg) of 147° C. as measured by differential scanning calorimetry.

To synthesize the block copolymers the polyoxypropylene diamine was combined with dimethyl terephthalate (DMT) in an argon atmosphere and heated to consume all amine groups. Ethylene glycol was then added to transesterify the dimethyl terephthalate terminated polyamine. As indicated in Table II the ratio of polyoxyalkyleneamine to dimethylterephthalate to ethylene glycol can be in the range of from 1:1:1 to 1:20:20. Methanol and excess glycol were removed under vacuum. Heat was applied under vacuum to induce polycondensation leading to the resulting alternating block copolymer.

It was found that additional dimethyl terephthalate may be added to produce an alternating block with a larger PET segment.

Blend characterization was accomplished using films prepared by solvent spin-casting. This method is described in R. E. Cohen, F. S. Bates and A. S. Argon, *Macromolecules*, Vol. 16, No. 7, (1983), which is incorporated herein by reference. This method gives homogeneous films while at the same time avoiding the possibility of transesterification and thermal instability of the JEFFAMINE ® and JEFFAMINE ® block copolymer at PET/PC melt temperatures during melt mixing. The polycarbonate/JEFFAMINE ® blends were dissolved in 100 g methylene chloride. Each film was cast from 2 g of polycarbonate and the corresponding amounts of JEFFAMINE ® blend in order to obtain weight ratios of polycarbonate to JEFFAMINE ® blend varying from 40:1 to 5:1. These solutions were mixed for 20 minutes on a magnetic stirrer which proved to be sufficient for complete dissolution of the polycarbonate and JEFFAMINE ®. Solutions were spin-cast within several hours of their creation in order to avoid any effect of solvent induced degradation of the low molecular weight JEFFAMINES ® as well as PC (polycarbonate degradation is observable after 2 days). After casting, each film was placed in a vacuum oven for a minimum of 2 days at 80° C. to remove all but up to approximately 0.1% of the remaining solvent.

The polyoxyalkylene polyamines used in the examples were polyoxypropylene diamines having molecular weights between about 200 and 5000. The various JEFFAMINES ® used enable variation in the block length of the JEFFAMINE ® segment of the copolymer. This, in turn allows for control of crystal size in the crystallized polycarbonate. For instance dimensions could be obtained in a crystallized polycarbonate to be used as a gas separation membrane which would allow for higher selectivity. The resulting alternating block copolymers were labeled as JP-16$^a$, JP=51$^a$ and JP-52$^a$ and tested for percent crystallinity at various temperatures. Results are recorded in Table I.

Table II records solubility and interaction parameters for copolymer compositions possessing various weight fractions of PET.

In Table III there is recorded data regarding the percent crystallinity of polycarbonate/JEFFAMINE ® blends at various weight ratios and thermal histories. The degree of crystallinity was calculated by comparison of heat of fusion with that of a 100% crystalline sample which is 34 cal/g. The values obtained were about 10% (within 2%) for all melting peaks. It should be noted that the crystallinity calculated here refers to the weight of polycarbonate in the blend, not to the whole material.

The preferred temperature in the instant invention is from 50° C. to 280° C.

Analysis of the products was carried out by electron microscopy. Thermal properties of the products were determined using a Perkins-Elmer differential scanning colorimeter.

Symbols used in the context of the examples have the following definitions:

$c(MPa)^{0.5c}$ - represents the solubility of the JEFFAMINE ® in polycarbonate.

$X_{AB}{}^d$ - represents the strength of the blend interaction and is calculated by the methods of Flory and Huggins.

For a further discussion see "A Study of the Compatibility of Blends of Polyoxyalkyleneamine-Poly(Ethylene Terephthalate) Multiblock Copolymers and Polycarbonate," Letton et al., supra.

The following examples are only given for illustration and are not intended to limit the invention in any way.

TABLE I

Summary of the Crystallinities Obtained during Isothermal Crystallization for PC/JEFFAMINE ®-PET Blends Crystallinities of PC/JEFFAMINE ®-PET blends (10:1 weight ratio) annealed at various temperature

| Annealing Temp. | Percent Crystallinity | | |
|---|---|---|---|
| | PC/JP-16$^a$ | PC/JP-51$^a$ | PC/JP-52$^a$ |
| 150° C. | 7.0 | 7.8 | — |
| 160° C. | 7.1 | 8.9 | 6.4 |
| 165° C. | — | — | 6.5 |
| 170° C. | 6.1 | 9.1 | 5.0 |
| 175° C. | — | — | 4.7 |
| 180° C. | 8.5 | 9.5 | 6.2 |
| 185° C. | — | — | 6.1 |
| 190° C. | 8.4 | 9.6 | — |

$^a$JP-16, JP-51 and JP-52 are JEFFAMINE ®-PET alternating block copolymers. Isothermal Crystallizations were conducted until the maximum extent of crystallinity obtained. Annealing time was about 50 to 100 min. The degree of crystallinity was calculated by comparison of the heat of fusion with that of a 100% crystalline sample which is 34 cal/g.

TABLE II

Block copolymers from JEFFAMINE ® D-2000, dimethyl terephthalate and ethylene glycol

| JEFFAMINE ®-PET[b] | D-2000:DMT:EG | PET-D-2000 wt % | State | $\delta_c(MPa)^{0.5}$ [c] | $\chi_{AB}$[d] |
|---|---|---|---|---|---|
| JP-16 | 1:2:1.5 | 16:84 | viscous resin | 18.49 | 0.0549 |
| JP-51 | 1:10:20 | 51:49 | paste | 20.62 | 0.0373 |
| JP-52 | 1:11:10 | 52:48 | soft solid | 20.68 | 0.0422 |

[b]The numerical values indicate the copolymer compositions express in weight fraction of PET
[c]Solubility parameters
[d]Flory-Huggins interaction parameters.

TABLE III

Crystallinities of PC/JEFFAMINE ® blends at various weight ratios and thermal histories

| Material | Annealing Temperature | Percent Crystallinity |
|---|---|---|
| PC/JEFFAMINE ® D-2000 weight ratio 15/1 | 180° C.* | 31 |
| PC/JEFFAMINE ® D-2000 weight ratio 15/1 | 170° C.* | 22 |
| PC/JEFFAMINE ® D-2000 weight ratio 15/1 | 160° C.* | 25 |
| PC/JEFFAMINE ® D-2000 weight ratio 15/1 | 155° C.* | 21 |
| PC/JEFFAMINE ® D-2000 weight ratio 15/1 | 150° C.* | 24 |
| PC/JEFFAMINE ® D-230 weight ratio 40/1 | ** | 93 |
| PC/JEFFAMINE ® D-230 weight ratio 30/1 | ** | 43 |
| PC/JEFFAMINE ® D-230 weight ratio 25/1 | ** | 8.4 |
| PC/JEFFAMINE ® D-230 weight ratio 20/1 | ** | 12.3 |
| PC/JEFFAMINE ® D-230 weight ratio 15/1 | ** | 11.6 |

*Annealing times between 4 and 5 hours for maximum crystallinity.
**These values were obtained during first heating trace after spin-casting at room temperature (methylene chloride solvent).
The degree of crystallinity was calculated by comparison of the heat of fusion with that of a 100% crystalline sample which is 34 cal/g.

What is claimed is:

1. A composition useful for enhancing the crystallization properties of polycarbonate which comprises an alternating block copolymer produced by:
   combining a polyoxypropyleneamine with dimethyl terephthalate in an argon atmosphere;
   heating to consume all amine groups;
   adding ethylene glycol sufficient to transesterify the dimethyl terephthalate terminated polyoxyalkyleneamine;
   removing by products under vacuum;
   heating under vacuum to induce polycondensation; and
   producing said alternating block copolymer.

2. A composition as described in claim 1 having a varied polyoxypropyleneamine block length produced by using polyoxypropyleneamine of different sizes.

3. A method of synthesizing an alternating block copolymer useful for enhancing the crystallization of bisphenol-A polycarbonate which comprises combining a polyoxypropyleneamine with a dimethylterephthalate in an argon atmosphere, heating the reactants, adding ethylene glycol sufficient to transesterify the dimethyl terephthalate terminated polyoxypropyleneamine, removing by-products under vacuum, and applying heat under vacuum to induce polycondensation.

4. The method of claim 3 wherein the reactants are heated at a temperature of from about 50° C. to about 280° C.

5. The method of claim 3 wherein the polyoxypropyleneamine is a polyoxypropylene diamine represented by the formula:

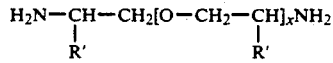

wherein R' represents methyl and x is a number having an average value of about 2 to about 70.

6. The method of claim 5 wherein the polyoxypropylene diamine has a molecular weight of about 230 and x has a value between 2 and 3.

7. The method of claim 5 wherein the polyoxypropylene diamine has a molecular weight of about 400 and x has a value of between about 5 and 6.

8. The method of claim 5 wherein the polyoxypropylene diamine has a molecular weight of about 2000 and x has a value of between about 33.

9. The method of claim 5 wherein the polyoxypropylene diamine has a molecular weight of about 4000 and x has a value of about 60.

* * * * *